United States Patent
Deutsch

[11] 3,749,197
[45] July 31, 1973

[54] OBSTACLE DETECTION SYSTEM

[76] Inventor: Benzion Deutsch, 901-51 St., Brooklyn, N.Y. 11219

[22] Filed: May 12, 1971

[21] Appl. No.: 142,496

[52] U.S. Cl................ 180/98, 180/103, 340/52 H, 340/62, 340/104, 343/7 ED, 343/7.3
[51] Int. Cl............................................. B60k 27/06
[58] Field of Search............... 180/98, 103, 105; 343/7 ED, 7.3; 340/62, 52 H, 104, 258 R; 188/110

[56] References Cited
UNITED STATES PATENTS

| | | | |
|---|---|---|---|
| 1,983,882 | 12/1934 | Rosenfeld | 180/98 |
| 3,448,822 | 6/1969 | La Lone et al. | 180/98 |
| 3,370,166 | 2/1968 | Rold et al. | 180/98 X |
| 3,493,920 | 2/1970 | MacMunn | 343/7 ED X |
| 2,996,137 | 8/1961 | Chu et al. | 180/98 |
| 2,216,575 | 10/1940 | Seinfeld et al. | 180/98 |
| 3,152,317 | 10/1964 | Mayer | 340/104 X |
| 2,804,160 | 8/1957 | Rashid | 180/98 |

*Primary Examiner*—Kenneth H. Betts
*Assistant Examiner*—John P. Silverstrim
*Attorney*—Richards & Geier

[57] ABSTRACT

A vehicle capable of motion, such as a car or a motor boat is provided with beams extending in front of the vehicle. The beams may be ultrasonic beams, radar or laser beams. Devices producing the beams and located within the vehicle have several automatically produced functions, namely, they can cause the beams to be raised or lowered, they can vary their effective lengths depending upon the speed of the vehicle and they can cause the vehicle to stop or to reduce its speed when an object located in front of the vehicle is sensed. The beams are also arranged to provide automatic adjustment to all changes in the angle between the road surface and the horizontal.

9 Claims, 8 Drawing Figures

PATENTED JUL 31 1973 3,749,197
SHEET 1 OF 3
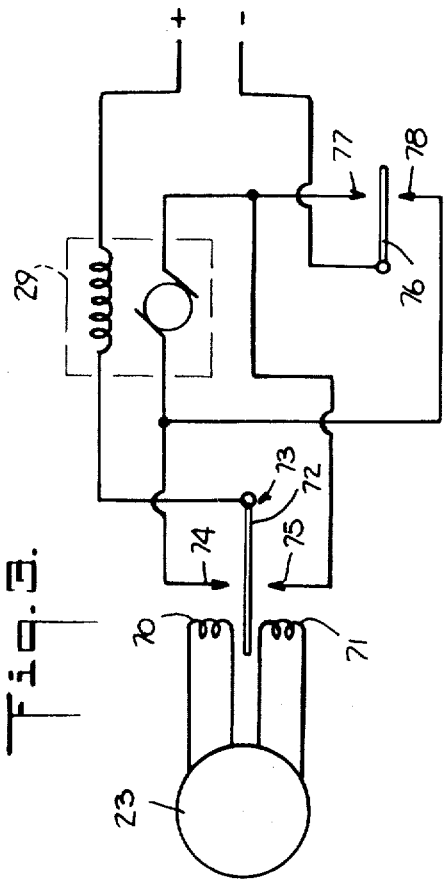
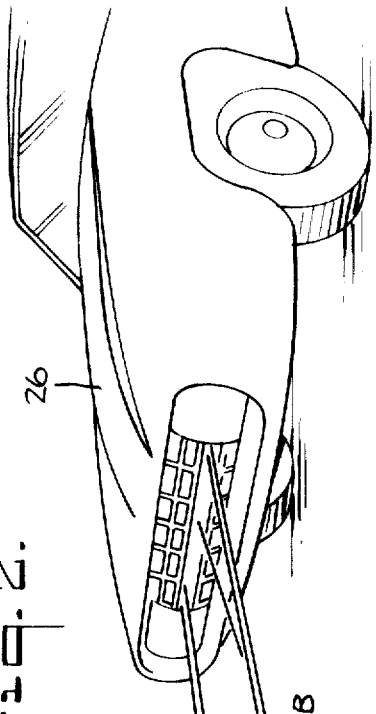
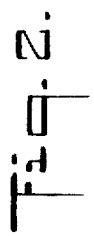
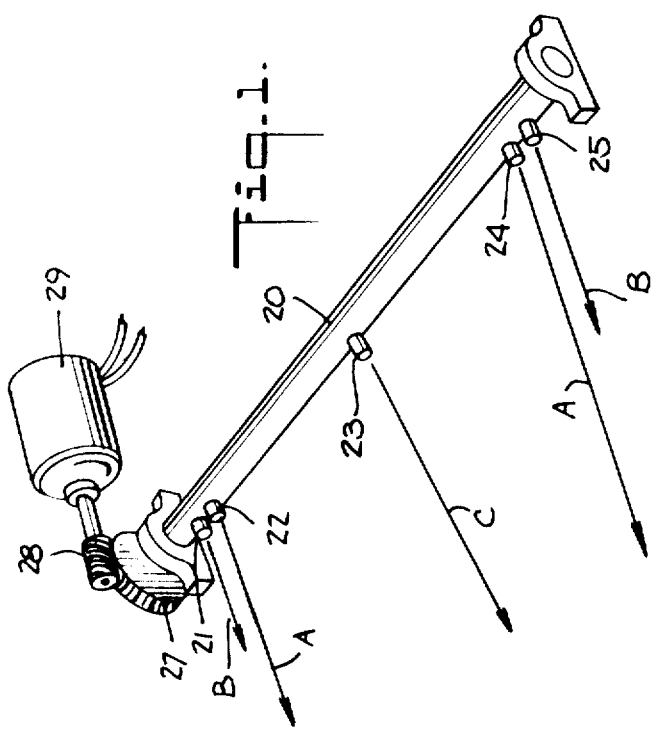
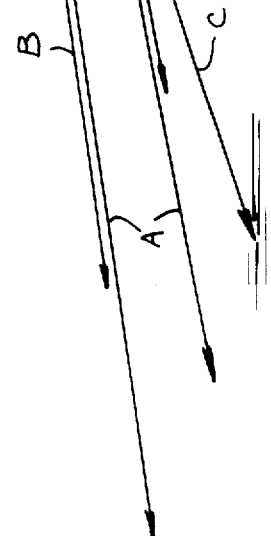
INVENTOR.
BENZION DEUTSCH
BY Richard G Geier
ATTORNEYS

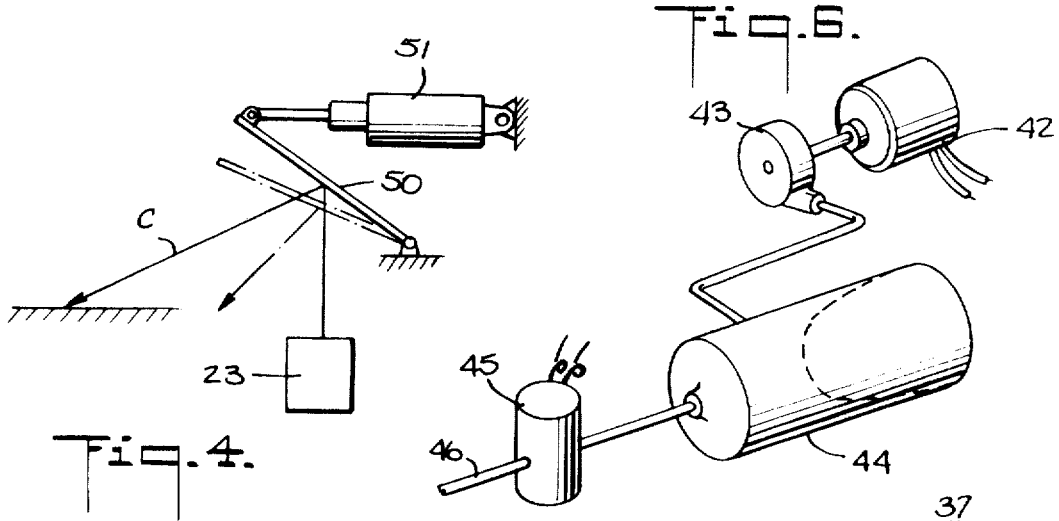
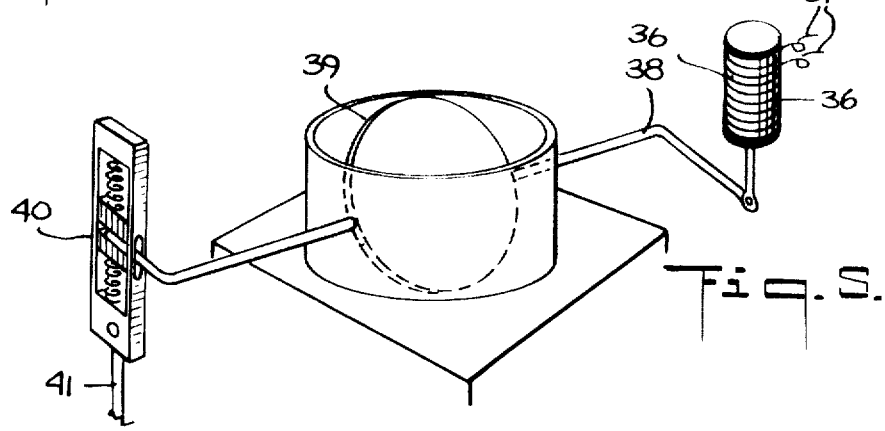
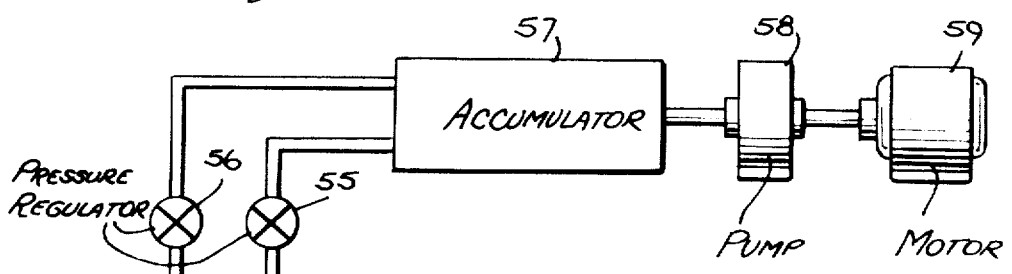
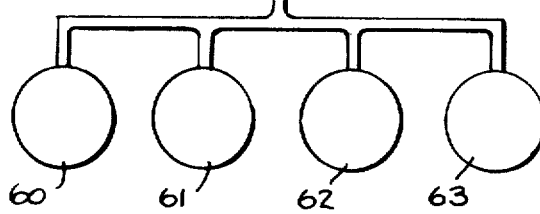

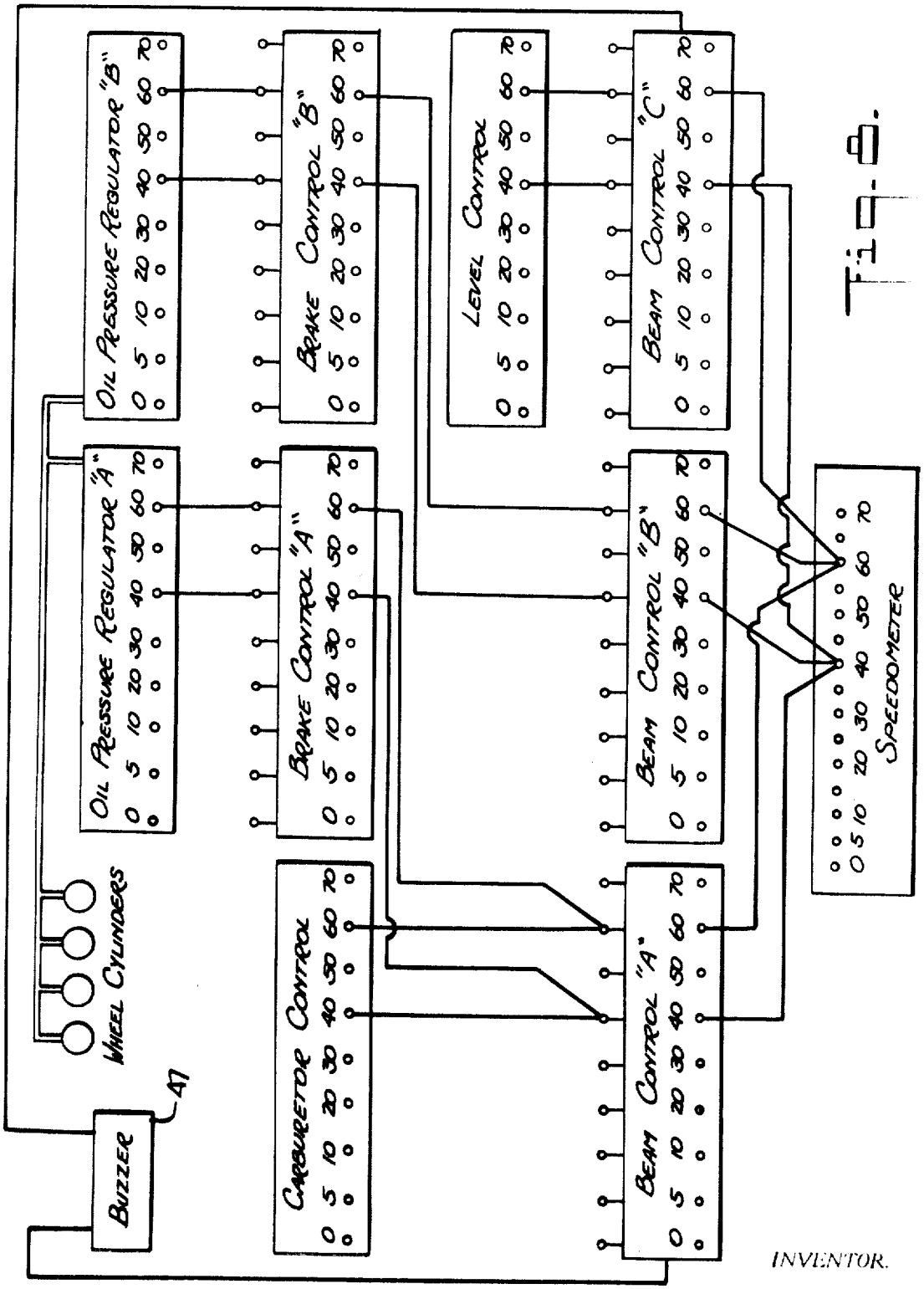

OBSTACLE DETECTION SYSTEM

This invention relates to an obstacle detection system and refers more particularly to a device which will detect an obstacle in front of a moving object, such as an automobile or a boat, and will reduce its speed, create an alarm, and bring it to a halt.

An object of the present invention is the provision of a device of this type which is most effective in use and which will respond to a veriety of occurrences under various conditions.

Other objects will become apparent in the course of the following specification.

In the accomplishment of the objectives of the present invention it was found desirable to provide three or more independent beams in front of an automobile or other vehicle, such as an airplane. The beams may be produced by ultrasonic devices and should be comparatively narrow. However, the beams may be radar or laser beams and may be replaced by electric eyes. These beams sense obstacles, adjust the carburetor and apply the brakes as required. Some of the beams are different in lengths and one of the beams is directed toward the ground. Devices producing the beams are carried upon a shaft which can be operated by a motor. When the beam which is directed toward the ground indicates that the distance from the beam emitter to the point where the beam strikes the ground is shorter than normal the shaft is rotated automatically to raise all beams. When the distance is greater than normal the shaft is rotated automatically to lower all beams. Additional beams may be directed from the sides of the vehicle.

Furthermore, means are provided to vary the length of the beams depending upon the speed of the car, namely, the faster the speed the greater will be the length of the beams. However, the beams keep their relative lengths. When a longer beam other than the one directed toward the ground strikes an object a signal is produced which operates a device reducing gradually the speed of the car. When a shorter beam other than the one directed toward the ground strikes an object a device is used which operates the brakes to stop the car. The length of the beams can be also adjusted by the driver to adapt them to his age, driving ability, etc. Normally the beams will be adjusted to take corrective action when an obstruction is closer to the vehicle than the spacing recommended or dictated by the controlling authority.

The invention will appear more clearly from the following detailed description when taken in connection with the accompanying drawings showing by way of example only, preferred embodiments of the inventive idea.

In the drawings:

FIG. 1 is a diagrammatic illustration of the beam shaft and control motor.

FIG. 2 shows diagrammatically a car producing the beams.

FIG. 3 is an electric circuit diagram showing the connections of the beam producing device with the motor operating the beam shaft.

FIG. 4 is a diagram illustrating a device for changing a beam angle.

FIG. 5 is a diagram illustrating a speed reducing device.

FIG. 6 is a diagram illustrating a brake applying device.

FIG. 7 is a box diagram illustrating a brake control.

FIG. 8 is a box diagram illustrating combined beam, alarm, brake and carburetor control.

FIG. 1 shows a shaft 20 carrying five beam producing devices 21 to 25 such as ultrasonic or lasar beams. Devices 22 and 24 are used to produce similar beams indicated as A, devices 21 and 25 produce similar beams B and device 23 produces beam C. The beams are projected side by side.

These beam producing devices are of standard construction and are not shown in detail in the drawings.

An important feature is that the beams A, B and C are of different lengths. The beams A are the longest ones while the beams B have about one half of the length of the beams A. The beam C may be made somewhat shorter than the beam A. Furthermore, as illustrated in FIG. 2 the beams A and B usually extend parallel to the ground on which the car 26 is travelling, while the beam C is directed downwardly toward the ground.

The shaft 20 carries a toothed gear 27 meshing with a worm 28 driven by a motor 29.

The device 23 producing the beam C is also a beam length receiver with the capacity to measure the length of the beam from the emitter to the point where the beam hits the ground. As shown in FIG. 3 the device 23 is connected with two relay coils 70 and 71. The device 23 will energize the relay coil 70 if the beam length from emitter to ground is less than normal. If it is greater than normal the coil 71 will be energized. If the length is normal neither relay coil will be energized and the armature 72 of relay 73 will be centered between contacts 74 and 75. The second armature 76 of the same relay will be centered between contacts 77 and 78. When the coil 70 is energized it will run the motor 29 one way. This will cause all beams to elevate. When the coil 71 is energized it will cause the motor 29 to run in the opposite direction, thereby lowering all the beams to bring the beam C back to its normal position.

As indicated in FIG. 2 the beam C always strikes the road surface a few feet short of the sensitivity of the beams A. In order to maintain this relationship between the beams A and B on the one hand and the beam C on the other hand, it is necessary to adjust the angle between beams A, B and the beam C. It should be noted that the beams A and B remain essentially parallel to each other at all times. To maintain the proper angular relationship an angle changing device shown in FIG. 4 is located in front of the beam C. The device includes a mirror 50 which is hinged at the lower edge while its upper edge is attached to a solenoid 51.

As the automobile speed increases the speed detecting unit sends a stronger signal to the solenoid 51. This stronger signal causes the solenoid to raise the mirror 50 which in turn causes the beam C to be shifted so that it strikes the road at a greater distance from the car. The speed detecting unit also sends a signal to the unit controlling the beam C to change the present normal length of the beam.

Actually the beam C will be depressed below the beams A and B to a greater extent as the speed of the car is decreased.

It is apparent that this actuation of the beam C can be also produced from the tilting device shown in FIGS. 1 and 3.

Devices 21 to 25 are also connected to ultrasonic generators so that a change of speed of the car causes these generators to actuate the beam producing devices 21 to 25 and thereby vary the lengths of the beam.

Another device is used to permanently set the length of the beams depending upon age and character of the driver.

The present invention is not limited to specific means reducing the speed of the car or stopping it when a beam strikes an object since a variety of devices can be used for that purpose. The following device is described by way of example only.

FIG. 5 shows a solenoid 36 which is connected by lines 37 to one or several beam producing devices, preferably devices 22 and 24 producing beams A. The solenoid 36 is connected by a shaft 38 with the usual butterfly device 39 and is also connected by a spring centered device 40 to a linkage arm 41. The device constitutes an attachment to the carburetor. The linkage arm 41 operates the butterfly device 39 in the usual manner by connection to the gas pedal on the automobile floor. The spring centered device 40 permits the solenoid 36 to provide the necessary actuation. Thus the speed of the car is gradually reduced.

FIG. 6 illustrates, by way of example only, a device used for applying braking action to the car. This device will be actuated by beam producing devices 22 and 24 producing beams A and also by devices 21 and 25 which emit shorter beams B. The device includes an electric motor 42 which drives a hydraulic pump 43. The motor 42 is operated whenever a pressure sensing device in the accumulator 44 indicates low pressure. The accumulator 44 is of the air bag type, the air in the bag serving as a spring to maintain pressure in the accumulator. A solenoid valve 45 is connected with the accumulator 44 and carries a hydraulic tube 46 leading to the hydraulic brake cylinders on the wheels of the car.

If it is desired to provide more than one degree of braking action, the device shown in FIG. 6 may be duplicated by a similar device delivering higher pressure oil to the wheel cylinders.

The car should be also provided with a visible or audible signalling device 47 which alerts the driver when the beams A indicate an obstruction, thereby giving the driver the option of adjusting the carburetor and operating the brakes in coperation with the automatic unit.

An alternative arrangement not shown in the drawings consist in providing an adjustable time delay device, so that the automatic devices will not function until a preset time interval has elapsed.

It should be noted that the described automatic braking device store its own oil supply and uses its own pressure device, so that it operates independently of the regular brakes. The braking action of the car is controlled by the system exerting the greatest pressure on oil or on the brakes.

FIG. 7 shows another brake control operated by beams A and B. Actually, the brake control actuated by the beam A sends an appropriate signal to the oil pressure regulator 55 which sends oil under pressure to the four wheel cylinders 60-63. The amount of pressure is adjusted depending upon the speed of the car. A second pressure regulator 56 is used when the beam B detects an obstruction. The regulators 55 and 56 are connected to an accumulator 57 which is connected by a pump 58 to a motor 69. The accumulator 57 is usually under full pressure. The motor 59 starts when the pressure drops. For each speed level oil pressure regulator 56 for the beam B applies more oil pressure than the oil pressure regulator for the beam A.

The beam B does not send an audible alarm to the alarm device 47 since this alarm has been provided by the beam A. Likewise, beam B does not send a signal to the carburetor control since the beam A always drops the carburetor to its idle position.

Furthermore, the beam B does not send a signal to the beam C generator 23 since an obstruction detected by the beam B has already been detected by the beam A.

It is possible to combine the two regulators 55 and 56 into a single unit. In that case the pressure produced by the beam B would override pressure produced by the beam A.

The above described operation of the beams and the devices which they actuate may cause complications when the same object is struck simultaneously by beams A and C. As already stated when the beam C strikes the ground at a distance less than its present length it will actuate the shaft 20 to raise all beams upwardly. Then the function of the beam A will be eliminated. To avoid this a switch is inserted into the power line leading to the motor 29 which swings the beams. As soon as the beam A strikes an object the beam producing devices not only adjust the carburetor and apply the brakes but also cut off all power supply to the motor 29. The device 23 producing the beam C may be also switched off at the same time.

It is also apparent that the lengths of the beams and the angles at which they are set can be adjusted, particularly when the car is reaching or is travelling upon an unusually hilly area.

The diagram of FIG. 8 shows that there is also a signal connection from the speedometer to the device 23 generating the beam C. The same signal is also transmitted to the level adjusting device which adjusts the angle between the beam C and the parallel beams A and B. FIG. 8 shows signal paths for speeds of 40 and 60 miles per hour. Parallel paths extend for speeds of 0, 5, 10, 30 and 70 miles per hour.

In operation, after the driver has adjusted the length of all beams, the car proceeds to move forward with its beams until the beam C which is directed toward the ground, indicates that the distance from the beam emitter to the point where the beam strikes the ground is shorter than normal, the shaft is rotated automatically to raise all beams. When the distance is greater than normal the shaft is rotated automatically to lower all beams. This adjustment procedure takes place whenever the ground ahead of the car moves up or down away from the plane of the road below the car.

While the car is moving the lengths of the beams are automatically adjusted to its speed. Obviously, the beams become longer as the speed increases. The change in speed is transmitted by the axle of the car through a drive to conduits and a generator connected with the beam producing devices 21 to 25, thereby varying the length of the beams.

When the long beams A strike an object a solenoid actuates an attachment on the carburetor and it operates to slowly reduce the supply of gas.

As shown in FIG. 8, beam control A is connected to brake control A which in turn applies the brakes using the lower pressure oil.

When the shorter beams B strike an object the device shown in FIG. 5 is actuated to operate the brakes.

When, for example, a car is driven at 40 miles per hour, the speedometer sends a signal to the beam generating devices 21 to 25. This signal will produce beams of specific length. When the car approaches an upgrade, beam C will strike the road and then the shaft 20 will turn to elevate all beams in the manner already described. When the car approaches a downgrade and the beam C indicates "no road surface" the beam control unit will be operated to lower all beams. However, when the beam A detects an obstruction in addition to lowering the engine speed it will switch off the beam C and operate the buzzer and apply the brakes.

It is apparent that many changes may be made in the described embodiments within the scope of the appended claims.

What I claim is:

1. In combination with a vehicle and driving means within the vehicle, an obstacle detecting device comprising means for projecting in front of said vehicle at least one beam, means for regulating said driving means, operable in response to said at least one beam striking an object, and an inclined beam extending downwardly relatively to said long beam, separate beam producing devices for the separate beams, a common shaft carrying said beam producing devices, a motor connected with said shaft and means actuating said motor and causing a turning of said shaft and the raising of said beams when said inclined beam strikes the ground at less than a preset distance.

2. A device in accordance with claim 1, comprising a long beam and a short beam extending parallel to each other projecting in front of said vehicle.

3. A device in accordance with claim 2, wherein the vehicle driving means comprise brakes and a speedometer, said device comprising means actuated by at least one of said beam producing devices and connected with said speedometer for automatically actuating said brakes when the beam projected by the last-mentioned beam producing device strikes an obstacle.

4. A device in accordance with claim 2, comprising means actuated by the vehicle driving means for varying the inclination of said inclined beam relatively to the other two beams.

5. A device in accordance with claim 4, wherein the last-mentioned means comprise a solenoid and a mirror connected with said solenoid and receiving said inclined beam, said solenoid varying the position of said mirror to vary the inclination of said inclined beam.

6. A device in accordance with claim 2, comprising means actuated by the vehicle driving means for varying the lengths of said beams depending upon the speed of the vehicle.

7. A device in accordance with claim 2, comprising manually operable means for varying the lengths of said beams.

8. A device in accordance with claim 2, wherein the vehicle driving means comprise a carburetor, said device comprising means actuated by at least one of said beam producing devices and connected with said carburetor for automatically diminishing the speed of the vehicle when the beam projected by the last-mentioned beam producing device strikes an obstacle.

9. A device in accordance with claim 2, wherein the vehicle driving means comprise brakes, said device comprising means actuated by at least one of said beam producing devices and connected with said brakes for automatically actuating said brakes when the beam projected by the last-mentioned beam producing device strikes an obstacle.

* * * * *